US008364337B2

(12) United States Patent
Takahashi et al.

(10) Patent No.: US 8,364,337 B2
(45) Date of Patent: Jan. 29, 2013

(54) FAILURE COUNTERMEASURE SUPPORTING SYSTEM FOR MOBILE VEHICLE

(75) Inventors: Susumu Takahashi, Nagareyama (JP); Katsuhiko Udagawa, Tokyo (JP); Masaya Hatayama, Yokohama (JP); Daisuke Sato, Yokohama (JP); Yoshinori Momiyama, Mitaka (JP)

(73) Assignee: Komatsu Ltd., Tokyo (JP)

( * ) Notice: Subject to any disclaimer, the term of this patent is extended or adjusted under 35 U.S.C. 154(b) by 714 days.

(21) Appl. No.: 12/310,717

(22) PCT Filed: Aug. 13, 2007

(86) PCT No.: PCT/JP2007/065823
§ 371 (c)(1),
(2), (4) Date: Dec. 15, 2009

(87) PCT Pub. No.: WO2008/038469
PCT Pub. Date: Apr. 3, 2008

(65) Prior Publication Data
US 2010/0174438 A1 Jul. 8, 2010

(30) Foreign Application Priority Data

Sep. 27, 2006 (JP) ................................ 2006-261828

(51) Int. Cl.
*G06F 7/00* (2006.01)
(52) U.S. Cl. ...................... 701/29.1; 701/29.4; 701/31.8
(58) Field of Classification Search ................. 701/29.1, 701/29.4, 29.5, 29.6, 29.7, 29.8, 30.5, 30.9, 701/31.1, 31.7, 31.8, 31.5, 32.1, 31.9
See application file for complete search history.

(56) References Cited

U.S. PATENT DOCUMENTS

| 6,370,454 | B1 * | 4/2002 | Moore ......................... 701/29.4 |
| 6,389,337 | B1 * | 5/2002 | Kolls ............................ 701/31.6 |
| 6,429,773 | B1 * | 8/2002 | Schuyler .................... 340/425.5 |
| 6,611,740 | B2 * | 8/2003 | Lowrey et al. ............... 701/29.4 |

FOREIGN PATENT DOCUMENTS

| JP | A-2003-178148 | 6/2003 |
| JP | A-2003-228555 | 8/2003 |
| JP | A-2004-145375 | 5/2004 |
| WO | WO 2006/085469 | 8/2006 |

OTHER PUBLICATIONS

International Search Report mailed on Sep. 11, 2007 for the corresponding International patent application No. PCT/JP2007/065823 (English translation enclosed).

* cited by examiner

*Primary Examiner* — Richard M. Camby
(74) *Attorney, Agent, or Firm* — Posz Law Group, PLC

(57) ABSTRACT

A failure countermeasure support system for efficiently determining upon countermeasures to be executed for remedying a failure of a construction machine, based upon information about the failure. There are provided: a plurality of maintenance databases 2, 3, 4, and 5; a structured information database 100 in which the maintenance information in the maintenance databases 2, 3, 4, and 5 is structured; a structured information search section 13 which searches the structured information database on the basis of failure information about a mobile vehicle, and extracts one or more structured information records; and a display control section 15 which outputs a list of the one or more extracted structured information records. The outputted list includes link information to maintenance information in the maintenance databases 2, 3, 4, and 5, corresponding to structured information records which are included in this list.

4 Claims, 16 Drawing Sheets

FIG. 2A
SHOP MANUAL STRUCTURED INFORMATION TABLE 210

| Field | Ref |
|---|---|
| BOOK ID | 2101 |
| REFERENCE NUMBER | 2102 |
| PAGE NUMBER | 2103 |
| DEVICE TYPE | 2104 |
| MODEL | 2105 |
| SERIAL NUMBER RANGE | 2106 |
| SPECIFICATION | 2107 |
| PAGE TITLE | 2108 |
| FILE NAME | 2109 |
| FILE PATH | 2110 |

FIG. 2B
PARTS CATALOG STRUCTURED INFORMATION TABLE 220

| Field | Ref |
|---|---|
| BOOK ID | 2201 |
| REFERENCE NUMBER | 2202 |
| PAGE NUMBER | 2203 |
| DEVICE TYPE | 2204 |
| MODEL | 2205 |
| SERIAL NUMBER RANGE | 2206 |
| SPECIFICATION | 2207 |
| PART NUMBER | 2208 |
| PART NAME | 2209 |
| COORDINATES | 2210 |
| PAGE TITLE | 2211 |
| FILE NAME | 2213 |
| FILE PATH | 2214 |

FIG. 2C
INSTRUCTION MANUAL STRUCTURED INFORMATION TABLE 230

| Field | Ref |
|---|---|
| BOOK ID | 2301 |
| REFERENCE NUMBER | 2302 |
| PAGE NUMBER | 2303 |
| DEVICE TYPE | 2304 |
| MODEL | 2305 |
| SERIAL NUMBER RANGE | 2306 |
| PAGE TITLE | 2307 |
| SPECIFICATION | 2308 |
| FILE NAME | 2309 |
| FILE PATH | 2310 |

FIG. 2D
SERVICE NEWS STRUCTURED INFORMATION TABLE 240

| Field | Ref |
|---|---|
| REGISTER NUMBERNo | 2401 |
| DEVICE TYPE | 2402 |
| MODEL | 2403 |
| SERIAL NUMBER RANGE | 2404 |
| SPECIFICATION | 2405 |
| TITLE | 2406 |
| DEVICE CODE | 2407 |
| PHENOMENON CODE | 2408 |
| FILE NAME | 2409 |
| FILE PATH | 2410 |

FIG. 3A

MACHINE NUMBER DATABASE 110

| MACHINE NUMBER | MODEL | DEVICE TYPE |
|---|---|---|
| #001121 | PC200 | TYPE6 |
| #001586 | PC200 | TYPE7 |
| #011783 | PC200 | TYPE7 |
| #011900 | PC200 | TYPE7 |
| #155133 | PC200 | TYPE8 |
| #161630 | PC200 | TYPE8 |
| #A00231 | PC300 | TYPE5 |
| #S01245 | WA500 | TYPE3 |
| #B11213 | D1552 | TYPE2 |
| ... | ... | ... |

FIG. 3B

FAILURE CODE DATABASE 120

| FAILURE CODE | DEVICE NAME | PART NAME |
|---|---|---|
| E02355 | PUMP CONTROLLER | BOLT |
| E02330 | PUMP CONTROLLER | WASHER |
| E33123 | PUMP CONTROLLER | BOLT |
| E35661 | PUMP CONTROLLER | O-RING |
| E55263 | ENGINE CONTROLLER | FRAME |
| E67812 | MONITOR CONTROLLER | HOSE |
| ... | ... | ... |

FIG. 6A

SHOP MANUAL STRUCTURED RECORD
(EXAMPLE)

| | |
|---|---|
| BOOK ID | ABCD |
| REFERENCE NUMBER | SJA0037 |
| PAGE NUMBER | 38 |
| DEVICE TYPE | PC200 |
| MODEL | 8 |
| SERIAL NUMBER RANGE | 50001~59999 |
| SPECIFICATION | - |
| PAGE TITLE | FAILURE CODE [CA2249] NO SUPPLY PUMP DELIVERY PRESSURE ANOMALY 2 |
| FILE NAME | 1234.txt |
| FILE PATH | ¥F:abcd¥efg |

FIG. 6B

SHOP MANUAL TEXT FILE (EXAMPLE)
(FILE NAME : ¥F:ABCD¥EFG:1234.TXT)

FAILURE CODE [CA2249]  NO SUPPLY PUMP DELIVERY PRESSURE ANOMALY 2
USER CODE E11  FAULT DETAILS    A NO DELIVERY PRESSURE ANOMALY HAS OCCURRED ON THE COMMON RAIL CIRCUIT

FIG.17

SEARCH RESULT LIST 500

| DEVICE TYPE | SPECIFICATION | SERIAL NUMBER RANGE | PAGE TITLE | |
|---|---|---|---|---|
| PC200 | STANDARD | 50001~59999 | FAILURE CODE [CA2249] NO SUPPLY PUMP DELIVERY PRESSURE ANOMALY 1 | Open |
| PC200 | STANDARD | 50001~59999 | FAILURE CODE [CA2249] NO SUPPLY PUMP DELIVERY PRESSURE ANOMALY 2 | Open |
| ... | ... | ... | ... | |

510, 520

FAILURE COUNTERMEASURE SUPPORTING SYSTEM FOR MOBILE VEHICLE

TECHNICAL FIELD

The present invention relates to a technique for supporting determination of failure countermeasures for a mobile vehicle, and in particular relates to a technique for supporting failure countermeasures by efficiently utilizing maintenance databases and past examples which have already been accumulated.

BACKGROUND ART

It is possible to determine countermeasures to be efficiently performed for maintenance of a mobile vehicle such as a construction machine or the like, using a database in which various types of information for maintenance have been accumulated. There are various types of such maintenance databases, such as, for example, manuals for troubleshooting, parts catalogs, instruction manuals, and the like.

Furthermore databases are also known in which, with a similar objective, past examples are registered which include failures which have actually occurred in the past, and countermeasures which have been taken against them.

Moreover, in Patent Citation #1, there is described a failure information management system in which a management server collects failure information from a vehicle such as a construction machine or the like which is operated in a workplace, and outputs a method for dealing with this failure or the like to the construction machine or the like.

Patent Citation #1: International Publication WO2006/085469

DISCLOSURE OF THE INVENTION

Problems to be Solved by the Invention

Now, when collecting various types of information related to mobile vehicles such as construction machines or the like, and performing centralized management thereof with a management server, it is desirable to perform the data processing efficiently, since the number of types of data and the amount of data becomes large.

Thus, an object of the present invention is, on the basis of failure information for a mobile vehicle, to provide support for efficiently determining countermeasures to be executed in order to remedy that failure.

A further object of the present invention is, when information specifying the state of a mobile vehicle has been acquired from a moving state management system, to provide support so that countermeasures suited to that state can be selected.

Means for Solving the Problems

The failure countermeasure support system for a mobile vehicle according to one embodiment of the present invention comprises: a data conversion means (12) which acquires failure information for a mobile vehicle; maintenance databases (2, 3, 4, 5) in which are stored items of maintenance information related to maintenance for remedying failures which it is feared may occur with the mobile vehicle; a structured information database (100) in which is stored structured information for referring to said items of maintenance information stored in said maintenance databases; a structured information search means (13) which searches said structured information database on the basis of said failure information for said motor vehicle which has been acquired, and extracts one or more structured information records related to said failure information; and a display control means (15) which outputs a list of said one or more structured information records extracted by said structured information search means. And, in said list outputted by said display control means, link information is included to maintenance information in said maintenance databases, corresponding to said one or more structured information records which are included in said list.

In a preferred embodiment, there may be further comprised a structured information extraction section (11) which extracts said structured information from maintenance information stored in said maintenance databases (2, 3, 4, 5), and stores a plurality of structured information records in said structured information database (100).

In a preferred embodiment, the maintenance database may consist of a plurality of individual databases; said structured information database (100) may consist of a plurality of structured information tables (210, 220, 230, 240) which respectively correspond to said plurality of individual databases, and a plurality of text files. And a plurality of said structured information records may be included in each of said plurality of structured information tables, and, in each said structured information record, there may be included identification information for one corresponding text file among said plurality of text files.

In a preferred embodiment, there may be further comprised: a past example database (6) which stores past example information, relating to countermeasures which were implemented in order to remedy a failure of a mobile vehicle which has occurred in the past, and which includes, at least, a device type, a model, a failure code, a device name, and a name of the phenomenon that occurred, related to the failure; and an individual database search means (14) which searches said past example database, and extracts past example information which matches one or more among the device type, the model, the failure code, the device name, and the name of the phenomenon that occurred, included in the failure information of said mobile vehicle that has been acquired. And said display control means may output past example information related to the result of extraction by said individual database search means, in order of closeness of the operating time period included in said past example information to the operating time period included in said failure information for said mobile vehicle which has been acquired.

In a preferred embodiment, said individual database search means may: extract, as first candidate instances, items of past example information for which the device type and model, or the device type, match the failure information for said mobile vehicle which has been acquired; make decisions, for said first candidate instances, as to whether or not a failure code matches the failure information of said mobile vehicle which has been acquired, and, if any of them match, take those of said first candidate instances which match as second candidate instances, while, if none match, taking said first candidate instances just as they are as second candidate instances; make decisions, for said second candidate instances, as to whether or not a device name matches the failure information of said mobile vehicle which has been acquired, and, if any of them match, take those of said second candidate instances which match as third candidate instances, while, if none match, taking said second candidate instances just as they are as third candidate instances; make decisions, for said third candidate instances, as to whether or not a name of the phenomenon that occurred matches the failure information of said mobile vehicle which has been acquired, and, if any of them match, take those of said third candidate instances which match as final candidate instances, while, if none match, taking said third candidate instances just as they are as final candidate instances; and output said final candidate instances.

In a preferred embodiment, along with said data conversion means being adapted to acquire failure information for said mobile vehicle from a moving state management system (8) of said mobile vehicle, also, in said failure information which is acquired, information specifying the water temperature or the oil temperature of said mobile vehicle may be included; and, when said water temperature or said oil temperature which is included in said failure information is an anomalous water temperature or an anomalous oil temperature, said individual database search means may search for past example information related to water temperature or to oil temperature from said past example database.

BEST MODE FOR CARRYING OUT THE INVENTION

In the following, an embodiment of the present invention will be explained with reference to the drawings. That is, to cite construction machines as an example of mobile vehicles, a system is explained by way of example for, when a failure has occurred with a construction machine, providing support for performing analysis of the cause of this failure, and for determining countermeasures on the basis of this analysis.

FIG. 1 is a figure showing the overall structure of this system.

This system comprises an integrated management system 1 which performs integrated management of a plurality of databases, a shop manual management system 2, a parts catalog management system 3, an instruction manual management system 4, a service news management system 5, and a past example management system 6 which manages past examples of failures and countermeasures. The shop manual management system 2, the parts catalog management system 3, the instruction manual management system 4, and the service news management system 5 are individual data management systems which are integrated by the integrated management system 1 and which manage information related to maintenance.

Here, the shop manual management system 2 manages manuals and the like, for example, troubleshooting manuals and the like, for dealing with failures with a database.

The parts catalog management system 3, as well as managing a parts catalog for the construction machines with a database, also performs on-line ordering of parts. The instruction manual management system 4 manages instruction manuals for the construction machines with a database. And the service news management system 5 manages, with a database, service news for publicizing product quality enhancement measures and the like which are performed during maintenance of construction machines.

Moreover, the past example management system 6 accumulates as instances, and manages with a database, failures of construction machines which have occurred in the past, and the results when dealing with them. Past example information which is accumulated by this past example management system 6 may, for example, consist of a plurality of text files. The details of an individual past example are described in each of the text files. In these past examples which are managed by the past example management system 6, for example, there may be included the type of the machine, the model, the serial number, the failure code, the device name, what happened, the countermeasures which were implemented, and moving state data when the failure occurred which may include the operating time, the water temperature, the oil temperature, and so on.

Moreover, this system receives notification from a construction machine moving state management system 8 of a problem that has occurred with a construction machine, such as a fault or the like. Here, this construction machine moving state management system 8 is a system which takes a plurality of construction machines as subjects of management, and monitors the operational states (i.e. the moving states) of these construction machines which are the subjects of management. For example, the moving state management system 8 and the construction machines which are the subjects of management may be built so as to be able to perform wireless communication, and then the moving state management system 8 will be able to collect the states of the construction machines which are the subjects of management, and which are performing tasks in a workplace, almost in real time.

The integrated management system 1, each of the individual data management systems 2 through 5, and the past example management system 6, may all be constituted as general purpose type computer systems, and each of the structural elements and functions of each of these systems 1 through 6 explained in the following may, for example, be implemented by the execution of a computer program.

As shown in this figure, the integrated management system 1 comprises a structured information extraction section 11 which extracts, from the individual data management systems 2 through 5, structured information of the data managed by each of them, a structured information database 100 which stores structured information extracted by the structured information extraction section 11, a data conversion section 12 which performs format conversion of data acquired from the moving state management system 8, a machine number database 110 and a data conversion section 120 which are used in data conversion, a structured information search section 13 which searches the structured information database 100, an individual database search section 14 which commands searching of the databases which are managed by the individual data management systems 2 through 5 and the past example management system 6, a display control section 15 which displays screens upon a display device (not shown in the figure, and the same hereinafter), a parts tracing section 16 which collects information related to the ordering of parts, and a tracing database 130 which stores data collected by the parts tracing section 16.

The structured information extraction section 11 extracts structured information in advance from the individual data management systems 2 through 5 related to the data which each of them manages, and registers this information in the structured information database 100. With this integrated management system 1, by thus accumulating the structured information from the plurality of individual data management systems in the structured information database 100 in advance, it becomes possible to search through the data from the individual data management systems 2 through 5 collectively and moreover efficiently.

Here, the structured information extraction section 11 includes a plurality of processing sections, as shown in FIG. 15. That is, the structured information extraction section 11 comprises a page separation section 111, a contents table and text information extraction section 112, and a structured record creation section 113.

Now, each of the shop manual management system 2, the parts catalog management system 3, the instruction manual management system 4, and the service news management system 5 takes a plurality of images as one management unit, and manages its data in the format of a book which includes contents table information and so on. The format of the data may be, for example, the PDF format.

Thus, the page separation section 111 divides the data in book format which is managed by each of the individual data management systems 2 through 5 into portions consisting of one page (one image) each.

The contents table and text information extraction section 112 cuts out the text from the image of each page which has been divided up by the page separation section 112, using character recognition. And the contents table and text information extraction section 112 makes the text which has thus been cut out into individual text files by page units (refer to FIG. 6B). The text files which have been created here are made into groups of text files 106 through 109, by units of the individual data management systems 2 through 5. Moreover, the contents table and text information extraction section 112 extracts contents table information from the data in book format.

The structured record creation section 113 creates structured records (refer to FIG. 6A) on the basis of the contents table information which was extracted by the contents table and text information extraction section 112 from the data in book and text format. And, by making these into tables by units of the individual data management systems 2 through 5, the structured record creation section 113 creates tables 210 through 240 of structured information.

In the structured information database 100, there are stored the tables of structured information 210 through 240 which have been respectively extracted from the shop manual management system 2, the parts catalog management system 3, the instruction manual management system 4, and the service news management system 5; and the respective text file groups 106 through 109 are also stored therein. In other words, the structured information which has been extracted from the shop manual management system 2 is stored in a shop manual structured information table 210, and the text data is stored in a shop manual text file group 106. In a similar manner, the structured information and the text data which have been extracted from the parts catalog management system 3 are stored in the parts catalog structured information table 220 and the parts catalog text file group 107; the structured information and the text data which have been extracted from the instruction manual management system 4 are respectively stored in the instruction manual structured information table 230 and the instruction manual text file group 108; and the structured information and the text data which have been extracted from the service news management system 5 are respectively stored in the service news structured information table 240 and the service news text file group 109. Moreover, failure codes, device names, the titles of the phenomena that have occurred, and so on are included in the plurality of text files that are included in each of the shop manual text file group 106, the parts catalog text file group 107, the instruction manual text file group 108, and the service news text file group 109.

Here, the data structure of each structured information table 210 through 240 is shown in FIGS. 2A, 2B, 2C, and 2D respectively.

As shown in FIG. 2A, this shop manual structured information table 210 contains the following data items: a book ID 2101, a reference number 2102, a page number 2103, a device type 2104, a model 2105, a serial number range 2106, a specification 2107, a page title 2108, a file name 2109, and a file path 2110.

The page title 2108 is the text of a title of each page of the shop manual. And sometimes a failure code, a device name, the name of what happened, or the like may be included in this text.

The file name 2109 is the file name of the text file of the page that corresponds to these records. This text file is stored in the shop manual text file group 106.

The file path 2110 is the file path of the file name 2109. It is possible to identify the text file uniquely by the file name 2109 and the file path 2110. In other words, the structured record and the text file are mutually linked together by the file name 2109 and the file path 2110.

And, as shown in FIG. 2B, the parts catalog structured information table 220 contains the following data items: a book ID 2201, a reference number 2202, a page number 2203, a device type 2204, a model 2205, a serial number range 2206, a specification 2207, a part number 2208, a part name 2209, a coordinates 2210, a page title 2211, a file name 2212, and a file path 2213.

The page title 2211 is the text of a title of each page of the parts catalog. And sometimes a failure code, a device name, the name of what happened, or the like may be included in this text.

The file name 2212 is the file name of the text file of the page that corresponds to these records. This text file is stored in the parts catalog text file group 107.

The file path 2213 is the file path of the file name 2212. It is possible to identify the text file uniquely by the file name 2212 and the file path 2213. In other words, the structured record and the text file are mutually linked together by the file name 2211 and the file path 2212.

Moreover, as shown in FIG. 2C, the instruction manual structured information table 230 contains the following data items: a book ID 2301, a reference number 2302, a page number 2303, a device type 2304, a model 2305, a serial number range 2306, a specification 2307, a page title 2308, a file name 2309, and a file path 2310.

The page title 2307 is the text of a title of each page of the instruction manual. And sometimes a failure code, a device name, the name of what happened, or the like may be included in this text.

The file name 2309 is the file name of the text file of the page that corresponds to these records. This text file is stored in the instruction manual text file group 108.

The file path 2310 is the file path of the file name 2309. It is possible to identify the text file uniquely by the file name 2309 and the file path 2310. In other words, the structured record and the text file are mutually linked together by the file name 2309 and the file path 2310.

And, as shown in FIG. 2D, the service news structured information table 240 contains the following data items: a register number 2401, a device type 2402, a model 2403, a serial number range 2404, a specification 2405, a title 2406, a device code 2407, a phenomenon code 2408, a file name 2409, and a file path 2410.

The title 2406 is the text of a title of the service news. And sometimes a failure code, a device name, the name of what happened, or the like may be included in this text.

The file name 2409 is the file name of the text file of the service news that corresponds to these records. This text file is stored in the service news text file group 109.

The file path 2410 is the file path of the file name 2409. It is possible to identify the text file uniquely by the file name 2409 and the file path 2410. In other words, the structured record and the text file are mutually linked together by the file name 2409 and the file path 2410.

Text data which has been extracted from the information in the databases managed by the individual data management systems 2 through 5 is stored in the respective text file groups 106 through 109. Each of these text file groups 106 through 109 includes a plurality of text files which are made for each page of the corresponding individual management systems 2 through 5. Each of these text file groups 106 through 109 corresponds to the structured information records of the corresponding pages of the structured information tables 210 through 240 by the file names 2109, 2212, 2309 and 2409 and the file paths 2110, 2213, 2310 and 2410.

Referring for a second time to FIG. 1, the data conversion section 12 converts moving state data, which has arrived as binary data from the moving state management system 8, into text data.

Here, the moving state data which is acquired from the moving state management system 8 is data which specifies the state of a construction machine in which a failure has occurred, and, for example, may include a machine number for uniquely identifying that construction machine, a failure code which specifies the nature of the fault, output values of sensors which are mounted to that construction machine (for example, water temperature, oil temperature, and so on), the operating time, the position information, and so on.

The structured information search section 13 searches the structured information database 100 on the basis of the moving state data which has been converted by the data conversion section 12 into text data.

Here, the structured information search section 13 comprises a plurality of processing units, as shown in FIG. 16. That is, the structured information search section 13 comprises a failure code extraction section 131, a failure code display section 132, and a search processing unit 133.

The failure code extraction section 131 extracts a failure code from the moving state data outputted by the data conversion section 12.

The failure code display section 132 may, for example, refer to a machine number database 110 and to a failure code database 120, and extracts a device type, a model, a device name, a part name and so on which are related to the failure code extracted by the failure code extraction section 131.

Here, FIGS. 3A and 3B show, respectively, examples of the data structures of the machine number database 110 and the failure code database 120.

As shown in FIG. 3A, the machine number database 110 maintains a correspondence between a machine number 1101, a device type 1102, and a model 1103. Due to this, it is possible to convert a machine number, which is identification information for each of the construction machines, into the device type and the model of that construction machine.

As shown in FIG. 3B, the failure code database 120 maintains a correspondence between a failure code 1201, a device name 1202, and a part name 1203. Due to this, it is possible to convert the failure code into the device name and the part name in relation to which this fault is occurring.

The search processing unit 133 performs search processing of the structured information database 100 using the failure code and the device type, the model, the device name, the part name and so on which have been extracted by the failure code display section 132.

For example, the search processing unit 133 may acquire, from among the structured information records which are stored in the various structured information tables 210 through 240, those structured information records for which the failure code, the device type, the model, the device name, the part name, or the like match. Moreover if, among the text file groups 106 through 109, there are any text files in which the failure code, the device type, the model, the device name, the part name, or the like is included, then the search processing unit 133 extracts those files. And it extracts from the various structured information tables 210 through 240 the structured information records which correspond to these text files which have been extracted.

Furthermore, the structured information search section 13 searches the structured information database 100 on the basis of input from a predetermined interface screen displayed by the display control section 15. At this time, the search extracts structured information records from the various structured information tables 210 through 240 on the basis of a device type, a model, a failure code, a part number, a free word or the like which has been inputted from the interface screen. Moreover, the text file groups 106 through 109 may be searched on the basis of a free word inputted from the interface screen, and, if there are one or more text files in which this free word is included, the structured information records which correspond to these text files are extracted.

The individual database search section 14 commands the individual data management systems 2 through 5 to search on the basis of a structured information record which has been extracted by the structured information search section 13. In other words, this individual database search section 14 notifies a unique key which is included in a structured information record extracted by the structured information search section 13 to the individual data management systems 2 through 5, and acquires information which is specified by this unique key.

For example, the book IDs 2101 and 2301, the reference numbers 2102 and 2302, and the page numbers 2103 and 2303 may be taken as unique keys for the shop manual management system 2 and the instruction manual management system 4. The book ID 2201, the reference number 2202, the page number 2203, and the coordinates 2210 may be taken as unique keys for the parts catalog management system 3. And the register number 2401 may be taken as a unique key for the service news management system 5. Accordingly, the individual database search section 14 notifies these items of the extracted structured information records to the respectively corresponding individual data management systems 2 through 5, and acquires various information therefrom.

Furthermore, the individual database search section 14 commands searching of the past example management system 6, on the basis of moving state data or the like acquired from the moving state management system 8. And, according to this search command, the past example management system 6 performs full text searching of the plurality of text files which it manages itself. And the individual database search section 14 acquires the text files related to the past examples which have been extracted by the past example management system 6 by this searching.

The display control section 15 displays upon the display device the information which has been acquired from the structured information search section 13, the individual data management systems 2 through 5, and the past example management system 6. Moreover, the display control section 15 displays upon the display device an interface screen for receiving input of search conditions for searching the individual data management systems 2 through 5 and the past example management system 6.

For example, the display control section 15 may make a list of one or more structured information records which the structured information search section 13 has extracted from the structured information database 100, and may display this list upon the display device. An example of a list screen 500 which is thus displayed is shown in FIG. 17.

On the search result list screen 500 shown in this figure, for each of the structured information records 510 which has been extracted, the device type, the specification, the page title and so on is displayed in list format. This list screen 500 includes regions 520 for receiving selection of any one of the structured information records in the list. When any one of these selection regions 520 is selected by the user, then the display control section 15 notifies the unique key of the structured information record 510 corresponding to that region 520 which has been selected to the individual database search section 14, and requests searching of the individual data management systems 2 through 5. In other words there is held, in correspondence to each of the selection regions 520, a unique key of the structured information record 510 which respectively corresponds thereto.

When the display control section 15 acquires the search results for each of the individual data management systems 2 through 5 from the individual database search section 14, it displays these search results upon the display device.

When some part has been ordered via the integrated management system 1, the parts tracing section 16 records this information. For example, the parts tracing section 16 may collect and record in the tracing database 130, information like the following:
(1) the ID of the user who has logged in;
(2) the moving state data which was acquired from the moving state management system 8;
(3) the parts information which was ordered by the parts catalog management system 3; and
(4) if the present failure and information relating thereto has been registered by the past example management system 6, this registered information.

Next, FIG. 4 is a flow chart showing the sequence of processing when the integrated management system 1 having the structure described above has collected data from the moving state management system 8.

First, the moving state data related to the construction machine in which the failure has occurred is acquired from the moving state management system 8 (a step S11), and the data conversion section 12 performs data conversion of this moving state data (a step S12).

Next, according to selection by the user, the integrated management system 1 performs either one, or both, of shop manual search processing (a step S13) and past example search processing (a step S14).

With the shop manual search processing of the step S13, it is possible to refer to a shop manual which deals with the failure of the construction machine which is the subject here. The details of this shop manual search processing will be described hereinafter. And, with the past example search processing of the step S14, if there are any past examples which correspond to the failure of the construction machine which is the subject here, then it is possible to extract them and to refer to them. The details of this past example search processing will be described hereinafter.

Next, it is decided whether or not the result of this past example search processing is that there is any past example which corresponds to the failure of the construction machine which has been notified from the moving state management system 8 (a step S15). Here, if there is such a corresponding past example (YES in the step S15), then a decision is made as to whether or not any part is registered which was used in this past example (a step S16). When there is a part registration for this past example (YES in the step S15), then this integrated management system 1 performs parts catalog processing (a step S17). The details of this parts catalog processing will be described hereinafter.

And, finally, after having implemented failure countermeasures while referring to the information and so on which has been obtained by the processing described above, input of the countermeasures which have actually been implemented is received, and is registered in the past example management system 6 (a step S18).

FIG. 5 shows the detailed sequence of processing during the shop manual search processing of the step S13.

In this shop manual processing, first, the structured information search section 13 searches the shop manual structured information table 210 on the basis of the moving state data (a step S21). In other words, the structured information search section 13 searches the shop manual structured information table 210 while taking the device type, the model, the serial number, and the failure code in the moving state data after data conversion as keys.

Next, a search is made as to whether or not this failure code is included in the shop manual text file group 106, which consists of page units (a step S22).

Here, the steps S21 and S22 will be explained using a concrete example.

FIG. 6 shows an example of a shop manual structured record, and an example of a text file which corresponds thereto. The text file is linked to the structured record by a file name 2109 and a file path 2110.

In the step S21, the structured information search section 13 extracts any structured record for which any one of the device type, the model, and the serial number in the moving state data agrees with the device type 2104, the model 2105, or the serial number range 2106, and any structured record for which the failure code in the moving state data is included in the page title 2108.

And, in the step S22, the structured information search section 13 searches for any text file in which the failure code of the moving state data is included. And, when extracting such a text file, the structured record which is linked to this text file by the file name 2109 and the file path 2110 is also extracted.

While the searching of the structured information tables and text files other than shop manuals will be described hereinafter, at those times as well, similar processing to that described above is performed in order to extract structured records.

Returning to FIG. 5, in the steps S21 and S22, the structured information search section 13 extracts structured information records for which the device type, the model, the serial number, or the failure code included in the page title match, or structured information records which are set in correspondence with text files in which this failure code is included. And the structured information search section 13 acquires the book ID 2101, the reference number 2102, the page number 2103, and the page title 2108 of any structured information record which has thus been extracted (a step S23).

Next, the display control section 15 displays the structured information records which have been acquired upon the list screen 500 (refer to FIG. 17) (a step S24).

When the user selects a structured information record from the list screen 500 (a step S25), the individual database search section 14 notifies the shop manual management system 2 of the book ID 2101, the reference number 2102, and the page number 2103 of the structured information record which has thus been selected. And, using these as keys, the shop manual management system 2 acquires the data for the page corresponding to this structured information record which has been selected (a step S26). Then, on the basis of this page data which has been acquired, the display control section 15 displays this page (a step S27).

At this time, the failure code which is included in the text of the displayed page is highlighted. Moreover, if a plurality of structured records are present upon the list screen 500, then, by the user selecting these structured records, it is possible to refer in sequence to the pages which correspond to them.

FIG. 7 shows the detailed sequence of processing during the past example search processing of the step S14.

As this past example searching, first, corresponding example extraction processing is performed (a step S31). In other words, this corresponding example extraction processing is processing for extracting past examples which correspond to the failure of the construction machine which is the current subject here. The details of this processing are shown in FIG. 8.

First, the individual database search section 14 commands the past example management system 6 to search for past corresponding examples for which the device type and the model agree with those of the construction machine in which the failure has occurred. And, according to the response from the past example management system 6, the individual database search section 14 decides whether or not there are any such past examples for which the device type and the model match (a step S401). And, if there is one such past example or more for which the device type and the model match (YES in the step S401), then these are first extracted as candidate instances (a step S402).

On the other hand, if there is no such past example for which the device type and the model match (NO in the step S401), then the individual database search section 14 commands the past example management system 6 to search for past corresponding examples for which the device type agrees with that of the construction machine in which the failure has occurred. And, according to the response from the past example management system 6, the individual database search section 14 decides whether or not there are any such past examples for which the device type matches (a step S403). And, if there is one such past example or more for which the device type matches (YES in the step S403), then these are extracted as candidate instances (a step S404).

If one or more candidate instances have been extracted in the step S402 or the step S404, then the individual database search section 14 decides whether or not, among these candidate instances, furthermore, there are one or more past corresponding examples whose failure codes match (a step S405). And if there is one or more among the candidate instances whose failure code also matches (YES in the step S405), then the candidate instances are restricted to these candidate instances whose failure codes also match (a step S406).

On the other hand, if there is also no past example whose device type matches (NO in the step S403), then the individual database search section 14 commands the past example management system 6 to search among all the past examples for past examples whose failure codes match, and decides whether or not at least one is present (a step S407). And, if there is one or more such past example whose failure code matches (YES in the step S407), then these are extracted as candidate instances (a step S408).

Next, if one or more candidate instances have been extracted, then the individual database search section 14 further decides whether or not, among these candidate instances, there are one or more past examples with the same device as the device in which the failure has occurred (a step S409). And if, among the candidate instances, there are one or more examples with the same device (YES in the step S409), then the candidate instances are restricted to those examples with the same device (a step S410).

On the other hand, if no candidate instances have yet been extracted (NO in the step S407), then the individual database search section 14 decides, from all the past examples, whether or not any past examples with the same device are present (a step S411). And if one or more past examples with the same device are present (YES in the step S411), then these are extracted as candidate instances (a step S412).

And, if some candidate instances have been extracted, then the individual database search section 14 decides whether or not, among these candidate instances, there are any past examples for which the phenomenon that occurred is the same as what happened when the failure occurred this time (a step S413). And if, among the candidate instances, one or more past examples are present with the same failure phenomenon (YES in the step S413), then the candidate instances are restricted to these examples with the same phenomenon (a step S414).

On the other hand, if no candidate instances have yet been extracted (NO in the step S411), then the individual database search section 14 makes a decision as to whether or not, among all the past examples, there is an example in which the phenomenon that occurred is the same as what happened when the failure occurred this time (a step S415). And if there is one or more past example with the same failure phenomenon (YES in the step S415), then this is extracted as the candidate instance (a step S416).

And, if one or more candidate instances have been extracted at this time point, then the individual database search section 14 takes these candidate instances which have been extracted as being the corresponding examples (a step S417). On the other hand, if no candidate instance has been extracted by the processing described above (NO in the step S415), then the individual database search section 14 decides that there is no corresponding example (a step S418).

Now, returning to FIG. 7, in a step S31 the corresponding example extraction processing described above is performed, and a decision is then made as to whether or not the result thereof is that a corresponding example has been extracted (a step S32). And if no such corresponding example has been extracted (NO in the step S32), then this processing terminates.

If any corresponding examples have been extracted (YES in the step S32), then a decision is taken as to whether or not the operating time period of the construction machine in which the moving state data is included exceeds some predetermined reference value (a step S33). And if this operating time period is greater than the predetermined reference value (YES in the step S33), then weighting of the corresponding examples which have been extracted is performed according to the respective operating time periods (a step S34). In other words, in the past examples, various information relating to the construction machines which were the subjects at those times is included, and among this information the operating time periods of the construction machines are also included. Thus, the operating time period of the construction machine in which the failure has occurred and which has become the subject, and the operating time periods which are recorded in the corresponding examples, are compared together. And the various corresponding examples are weighted in the order of closeness to the operating time period of the construction machine in which the failure has occurred.

Moreover, if the water temperature and the oil temperature of the construction machine which are included in the moving state data are exceeding their respective normal values (YES in the step S35), then restriction is performed, among the corresponding examples which have been extracted, to those examples related to anomalous water temperature or anomalous oil temperature (a step S36).

And the display section 15 displays the corresponding examples (a step S37). At this time, if weighting was performed in the step S34, then these examples are displayed in the order of high weighting, in other words preferentially from that example for which the operating time period is closest to the operating time period of the construction machine in which the failure has occurred.

Next, FIG. 9 is a flowchart showing the detailed sequence of processing during the parts catalog processing of the step S17.

For this parts catalog processing, first, the structured information search section 13 searches the parts catalog structured information table 220 on the basis of the part numbers and the part names which were registered for the corresponding examples extracted in the step S37 (a step S51). In other words, the structured information search section 13 searches the parts catalog structured information table 220 using, as keys, the device types, the models, and the serial numbers of the moving state data after data conversion, and the registered parts numbers and the parts names.

Next, in the parts catalog text file group 107 which is made up of page units, searching is performed as to whether or not the parts numbers and the parts names which were registered for the corresponding examples extracted in the step S37 are included (a step S52).

And the structured information search section 13 extracts those structured information records for which the device type, the model, the serial number, the part number, and the part name match, or the structured information records which are in correspondence with text files in which these are included, and acquires the book IDs 2201, the reference numbers 2202, the page numbers 2203, the coordinates 2210, and the page titles 2211 of these records (a step S53).

Next, the display control section 15 displays the structured information records which have been acquired as a list screen 500 (refer to FIG. 17) (a step S54).

When the user selects a structured information record from the list screen 500 which is displayed (a step S55), the individual database search section 14 notifies the book ID 2201, the reference number 2202, the page number 2203, and the coordinates 2210 of the structured information record which has been selected to the parts catalog management system 3. And, with these as keys, the parts catalog management system 3 acquires the data for the page corresponding to the structured information record which was selected (a step S56). At this time, the parts catalog management system 3 performs predetermined processing of the page data which has been acquired, so as to display the position which shows the coordinates 2210 as highlighted. And, when the display control section 15 displays a page of the parts catalog on the basis of this page data, this page is displayed in the state with the part at the position which corresponds to the coordinates 2210 highlighted. Moreover, by selecting one or more structured information record as required from the list screen 500 which has been displayed, the user is able to refer to a plurality of pages of the part catalog (a step S57).

Here, when the user orders the parts, a list of parts to be ordered is created. This list of parts to be ordered is notified to the parts catalog management system 3, and the necessary parts may be ordered on-line by issuing an order command (steps S58 and S59). It should be understood that the user is able to add parts to this list of parts to be ordered by appropriately selecting other parts that are required.

Due to this, when a notification of the occurrence of a failure has been received from the moving state management system 8, the integrated management system 1 is able to refer to shop manuals and to past examples related to this failure. Because of this, the user is able to perform analysis of the cause of the failure and investigation of countermeasures, while referring to these shop manuals and past examples.

Furthermore, when it is necessary to exchange some part in order to remedy the failure, among the series of operations to be performed, it is also possible to perform ordering of the part by utilizing the parts catalog management system.

When ordering of parts is performed according to the processing described above, parts tracing is also performed by the parts tracing section 16, as will now be described.

FIG. 10 is a flow chart showing the parts tracing processing

First, at the time point that the user logs in to the integrated management system 1, the parts tracing section 16 acquires the ID of this user and log-in information such as the time instant or the like (a step S101).

Furthermore, when the data has been collected from the moving state management system (the step S11 of FIG. 4), the parts tracing section 16 gathers the device type, the model, the serial number, the failure code, the device name, and the failure phenomenon and the date, which are included in the moving state data after conversion by the data conversion section 12 (a step S102).

Moreover, when parts are ordered for the failure which is the subject (the step S36 of FIG. 9), the parts tracing section 16 acquires information about the parts which have been ordered from the parts catalog management system 3 (a step S103).

And, when information about the failure which is the subject has been registered in the past example management system 6, the parts tracing section 16 acquires the details of this registration of past instances, including the countermeasures which were instituted and so on (a step S104).

And the parts tracing section 16 registers the items of information which have been acquired by the processing described above in the tracing database 130, in mutual correspondence (a step S105).

Due to this, when a failure has occurred, it is possible automatically to record the details of this failure and the details for dealing with this failure. The contents registered in the tracing database 130 may be referred to as appropriate.

Although the processing on the basis of the moving state data acquired from the moving state management system 8 is as described above, apart from the above, the integrated management system 1 may also perform searching of the individual data management systems.

For example, FIG. 11 shows a flow chart of the sequence of processing for searching the shop manuals, on the basis of input from a predetermined search screen displayed by the display control section 15.

First the user inputs upon a search screen, as search conditions, one or more of a device type, a model, a serial number, a specification, and a free word (a step S61). The free word in this description could be a failure code, or a device name, or the name of what happened, or the like.

And, according to these search conditions which have been inputted, the structured information search section 13 searches the shop manual structured information table 210 and the shop manual text file group 106, which is structured in units of pages (steps S62 and S63). At this time, the searching of the text file group 106 is performed for the text which has been inputted via the free word. And, if there are some pages in which the free word is included, the structured information search section 13 extracts the structured information records which is set in correspondence with the text file group of these pages from the shop manual structured information table 210.

And, when the structured information records which corresponds to the search condition have been extracted (YES in the step S64), then the structured information search section 13 acquires the book IDs 2101, the reference numbers 2102, the page numbers 2103, and the page titles 2108 of these structured information records, and causes the display control section 15 to display these upon the list screen 500 (refer to FIG. 17) (steps S65 and S66).

When the user refers to this list screen 500 and selects a page which he wishes to peruse upon this list screen 500, the individual database search section 14 issues a page acquisition command for this page to the shop manual management system 2, in which the book ID 2101, the reference number 2102, and the page number 2103 are notified. And, when the shop manual management system 2 has acquired the data for the designated page by using the notified items as a key, this page is displayed by the display control section 15 (a step S67). At this time, the free word in the page is highlighted. Moreover, when the user wishes to peruse a plurality of pages, he can cause them to be displayed in sequence.

Next, FIG. 12 shows a flow chart of the sequence of processing for searching the parts catalog, on the basis of input from a predetermined search screen displayed by the display control section 15.

First the user inputs upon a search screen, as search conditions, one or more of a device type, a model, a serial number, a specification, a part number, and a part name (a step S71).

And, according to these search conditions which have been inputted, the structured information search section 13 searches the parts catalog structured information table 220 and the parts catalog text file group 107, which is structured in units of pages (steps S72 and S73). And, when one or more text files have been extracted from the parts catalog text file group 107, the structured information records which are set in correspondence with these text files are extracted from the parts catalog structured information table 220.

And, when one or more structured information records which correspond to the search condition have been extracted (YES in the step S74), then the structured information search section 13 acquires the book IDs 1021, the reference numbers 1022, the page numbers 1023, the coordinates 2210, and the page titles 2211 of these structured information records, and causes the display control section 15 to display these upon a list screen (steps S75 and S76).

When the user refers to this list screen 500 and selects a page which he wishes to peruse upon this list screen 500, the individual database search section 14 issues a page acquisition command for this page to the parts catalog management system 3, in which the book ID 2101, the reference number 2102, the page number 2103, and the coordinates 2210 are notified. At this time, the parts catalog management system 3 performs predetermined processing upon the page data which has been acquired, so as to display a position which indicates the coordinates 2210 as highlighted. And, when this page of the parts catalog is displayed by the display control section 15 on the basis of this page data, the page is displayed in the state with the part in the position which corresponds to the coordinates 2210 being highlighted. Here, the user is able to refer to a plurality of parts catalog pages by selecting the required one or more part from the list screen which is displayed (a step S77).

Moreover, here, when the user orders some parts, an order parts list is created, and he may order on-line the parts which he requires by issuing a command to notify this list to the parts catalog management system 3 (steps S78 and S79).

Next, FIG. 13 shows a flow chart of the sequence of processing for searching the instruction manuals, on the basis of input from a predetermined search screen displayed by the display control section 15.

First the user inputs upon a search screen, as search conditions, one or more of a device type, a model, a serial number, a specification, and a free word (a step S81). The free word in this description could be a failure code, or a device name, or the name of what happened, or the like.

And, according to these search conditions which have been inputted, the structured information search section 13 searches the instruction manual structured information table 230 and the instruction manual text file group 108, which is structured in units of pages (steps S82 and S83). At this time, the searching of the text file group 108 is performed for the text which has been inputted via the free word. And, if there are some text files in which the free word is included, the structured information search section 13 extracts the structured information records which are set in correspondence with these text files from the instruction manual structured information table 230.

And, when one or more structured information records which correspond to the search condition have been extracted (YES in the step S84), then the structured information search section 13 acquires the book IDs 2301, the reference numbers 2302, the page numbers 2303, and the page titles 2308 of these structured information records, and causes the display control section 15 to display these upon a list screen (steps S85 and S86).

When the user refers to this list screen and selects a page which he wishes to peruse, the individual database search section 14 issues a page acquisition command for this page to the instruction manual management system 4, in which the book ID 2301, the reference number 2302, and the page number 2303 are notified. And, when the instruction manual management system 4 has acquired the data for the page which has been designated according to this command, this is displayed by the display control section 15 (a step S87). At this time, the free word is highlighted within the page. Moreover, if the user wishes to peruse a plurality of pages, then he can cause them to be displayed in sequence.

Next, FIG. 14 shows a flow chart of the sequence of processing for searching the service news, on the basis of input from a predetermined search screen displayed by the display control section 15.

First the user inputs upon a search screen, as search conditions, one or more of a device type, a model, a serial number, a specification, and a free word (a step S91).

And, according to these search conditions which have been inputted, the structured information search section 13 searches the service news structured information table 240 and the service news text file group 109, which includes the text files for various units of service news (steps S92 and S93). At this time, the search using the free word is performed according to whether or not this free word is included in the service news text files, which are structured in units of pages. And, if there are some text files in which the free word is included, the structured information records which are set in correspondence with these text files are extracted from the service news structured information table 240.

And, when one or more structured information records which correspond to the search condition have been extracted (YES in the step S94), then the structured information search section 13 acquires the registered numbers 2401 and the titles 2406 of these structured information records, and causes the display control section 15 to display these upon a list screen (steps S95 and S96).

When the user refers to this list screen and selects a page which he wishes to peruse, the individual database search section 14 notifies the registered number 2401, and commands this page to be acquired. And, when the service news management system 5 has acquired the data for the page which has been designated according to this command, this is displayed by the display control section 15 (a step S97). Moreover, if the user wishes to peruse a plurality of pages, then he can cause them to be displayed in sequence.

The embodiment of the present invention described above is only shown by way of example for explanation of the present invention; the range of the present invention is not to be considered as being limited to that embodiment. A person skilled in the art would be able to implement the present invention in various other ways, provided that the gist of the present invention is not departed from.

BRIEF DESCRIPTION OF THE DRAWINGS

FIG. 2A shows an exemplary data structure of a shop manual structured information table;

FIG. 2B shows an exemplary data structure of a parts catalog structured information table;

FIG. 2C shows an exemplary data structure of an instruction manual structure information table;

FIG. 2D shows an exemplary data structure of a service news structured information table;

FIG. 3A shows an exemplary data structure of a machine number database;

FIG. 3B shows an exemplary data structure of a failure code database;

FIG. 6 shows examples of a structured record and of a text file;

FIG. 17 shows an example of a list screen 500.

Figure 1:
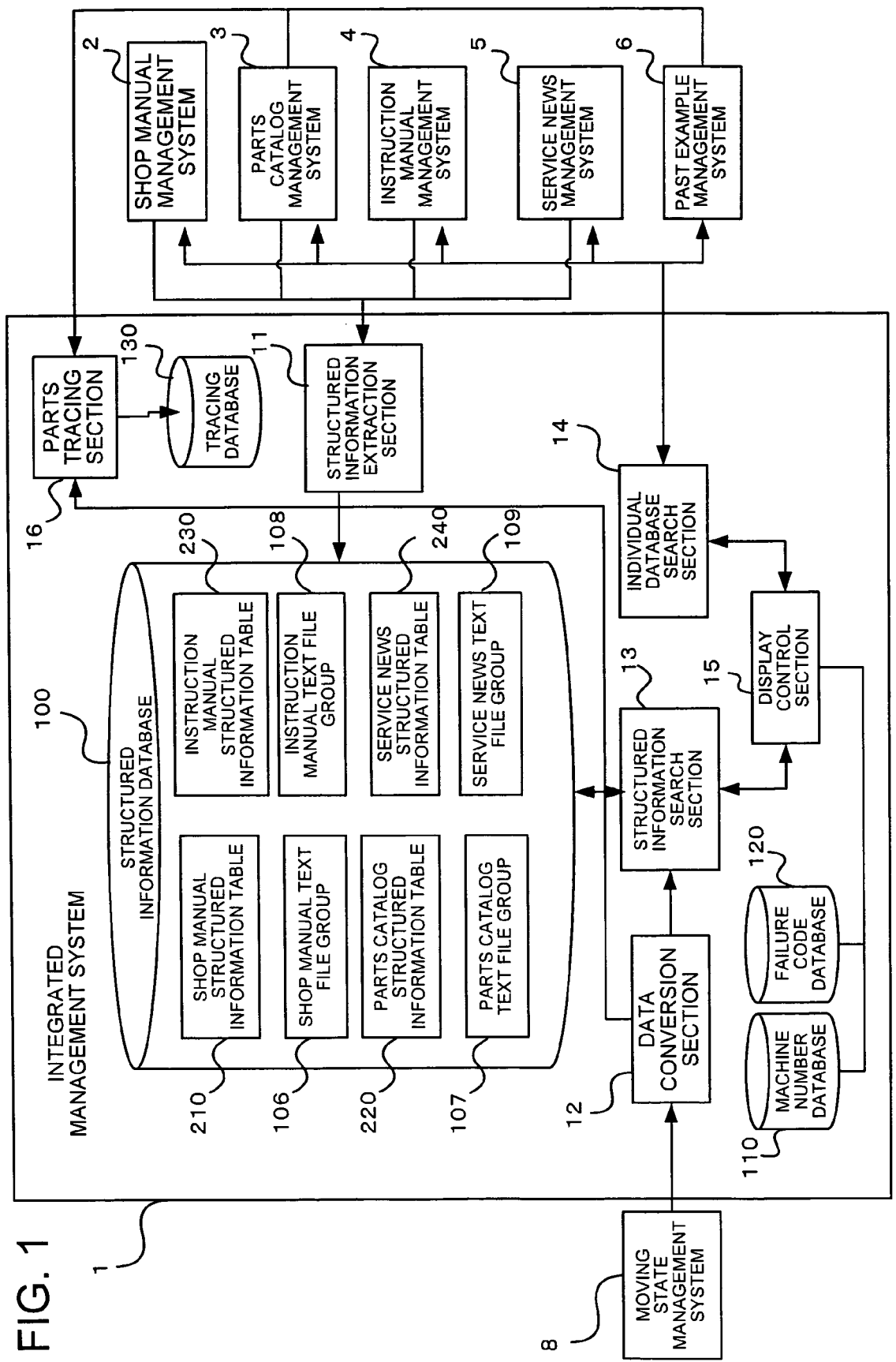
FIG. 1 is an overall structural figure of a failure countermeasure support system for a construction machine, according to one embodiment of the present invention.
Figure 4:
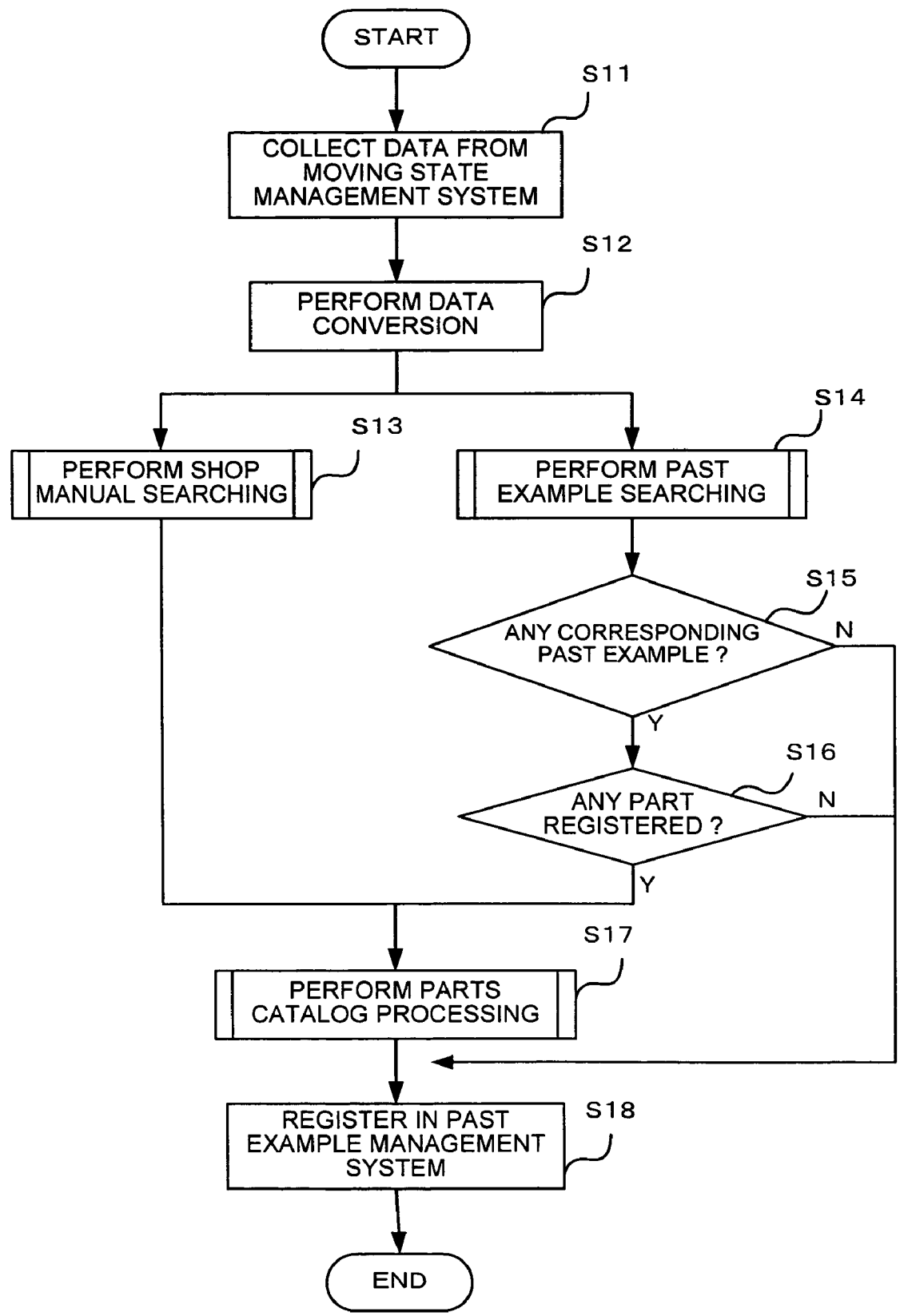
FIG. 4 is a flow chart for when data has been collected from a moving state management system.
Figure 5:
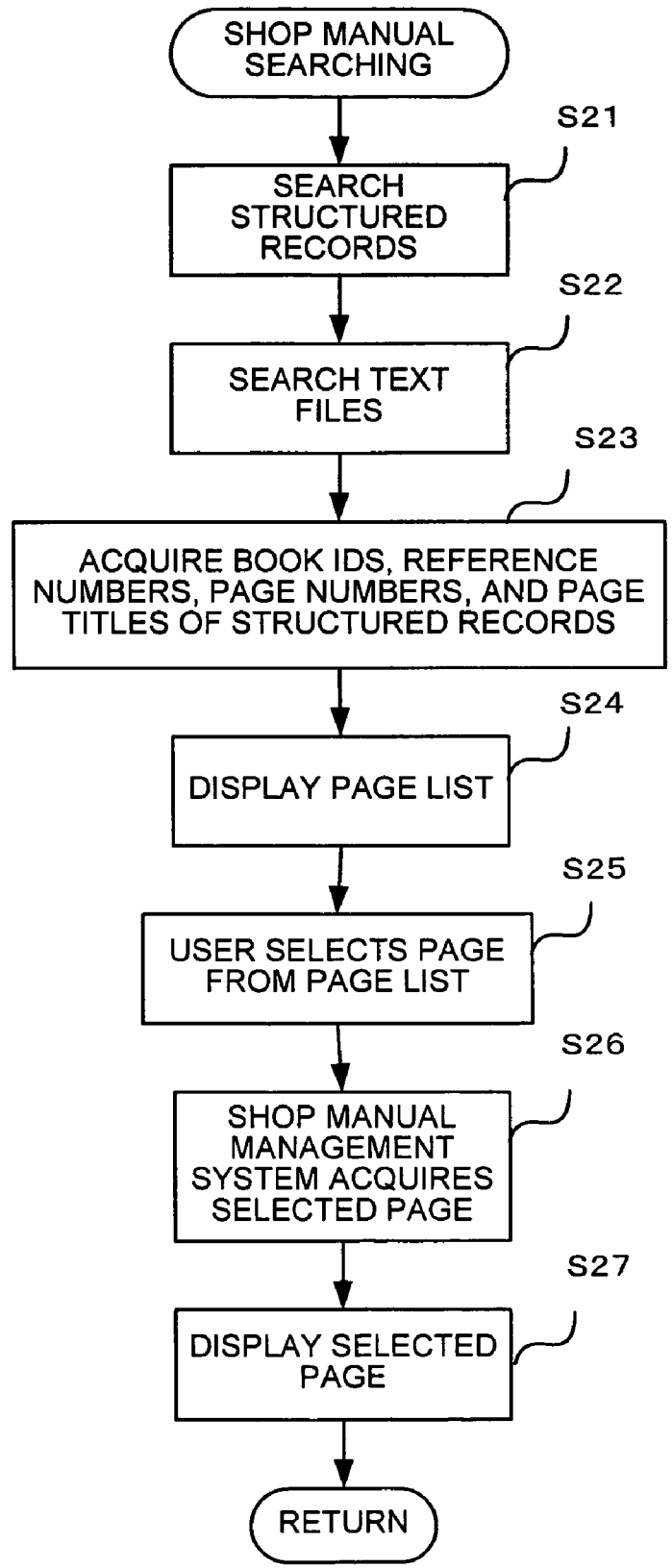
FIG. 5 is a flow chart of shop manual search processing in a step S12.
Figure 7:
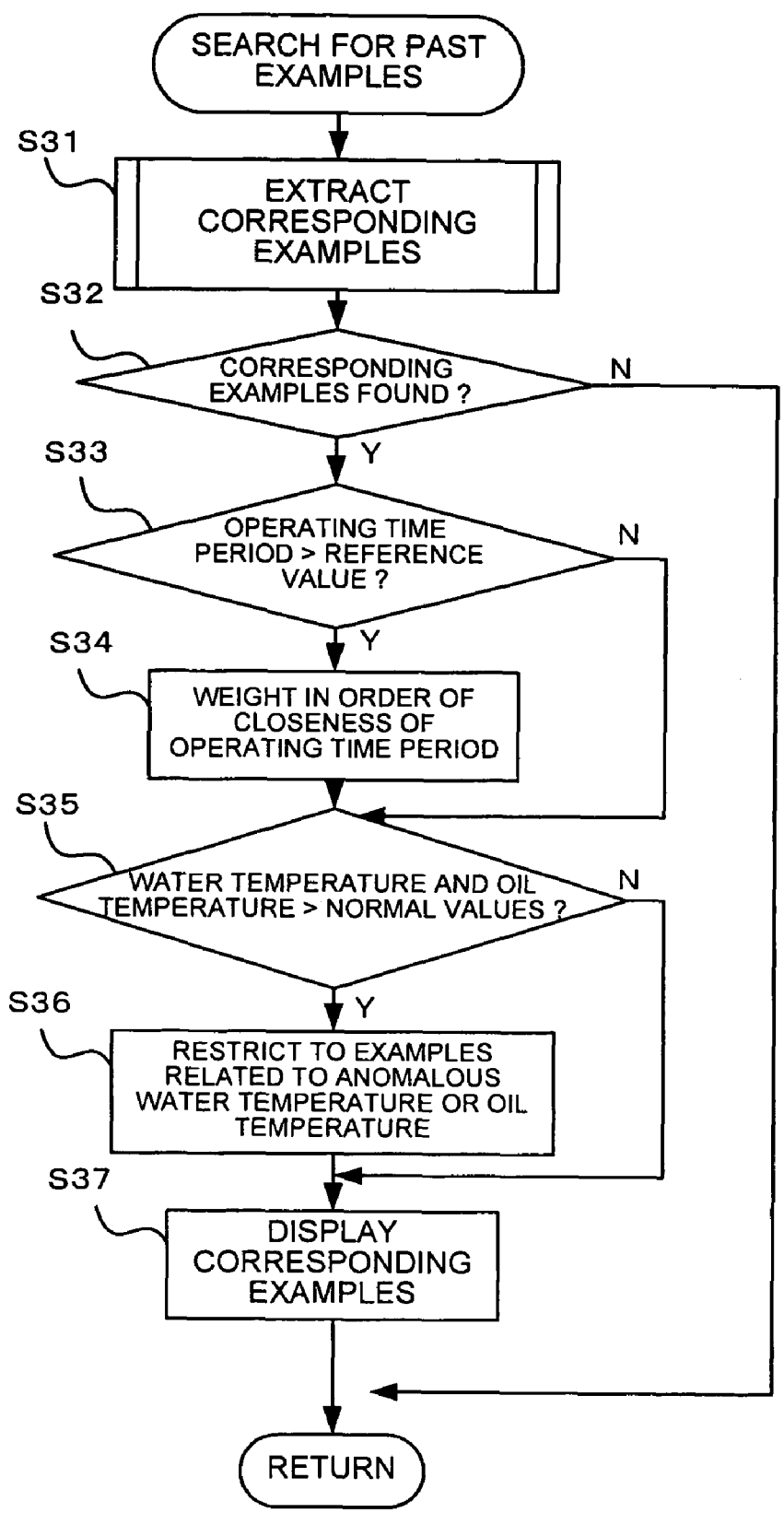
FIG. 7 is a flow chart of past example search processing in a step S14.
Figure 8:
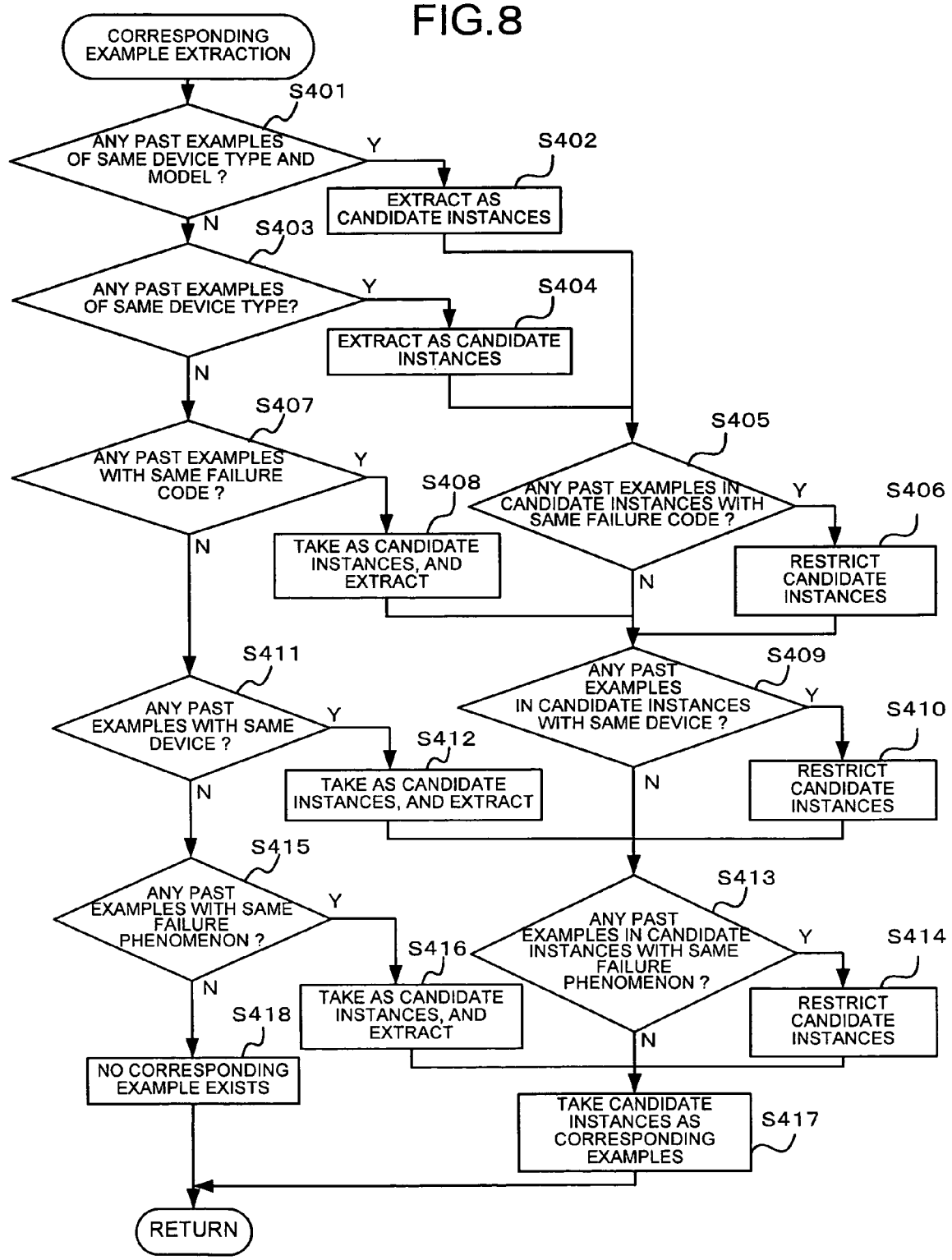
FIG. 8 is a flow chart of corresponding example extraction processing in a step S31.
Figure 9:
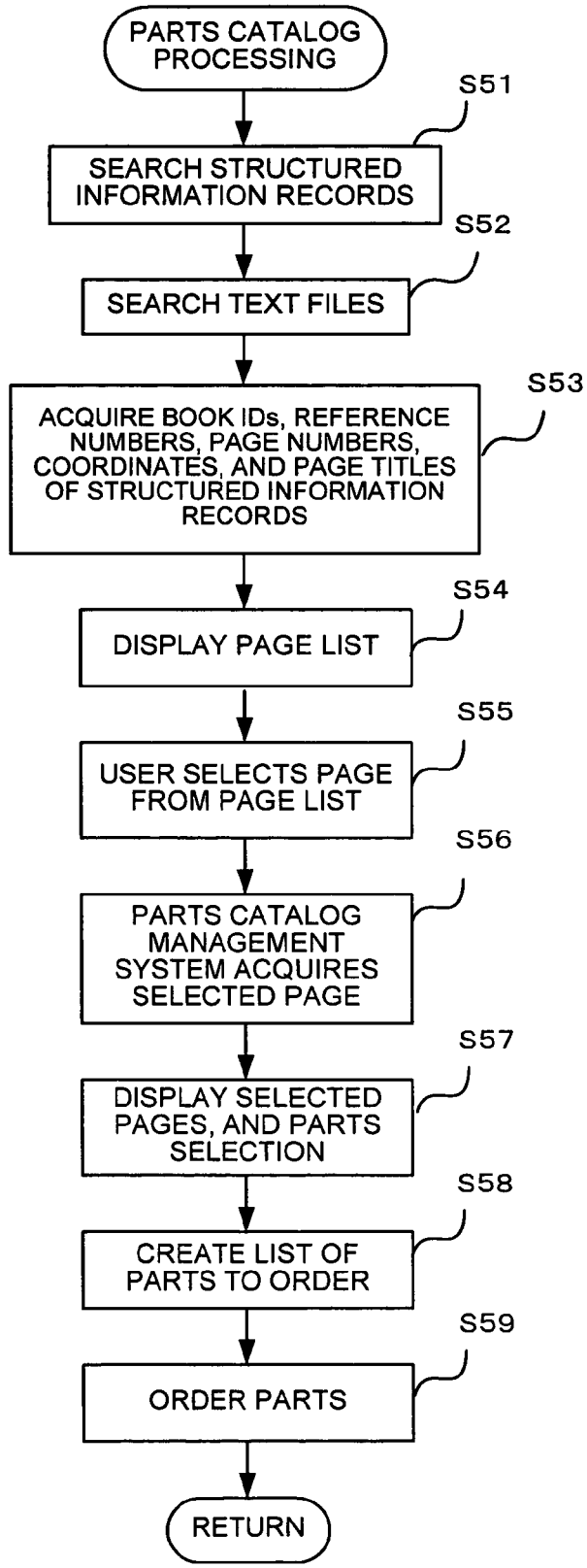
FIG. 9 is a flow chart of parts catalog processing in a step S17.
Figure 10:
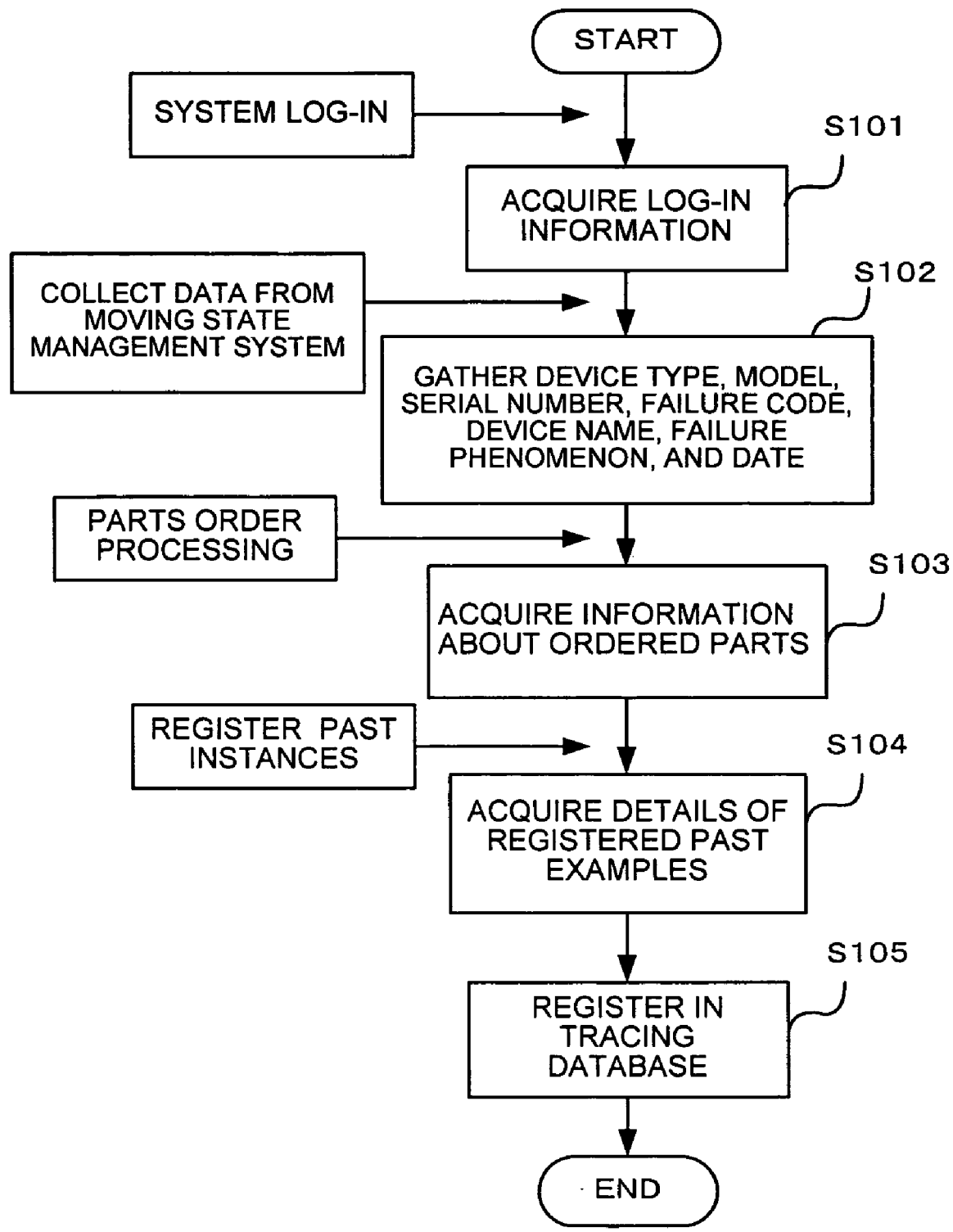
FIG. 10 is a flow chart showing parts tracing processing.
Figure 11:
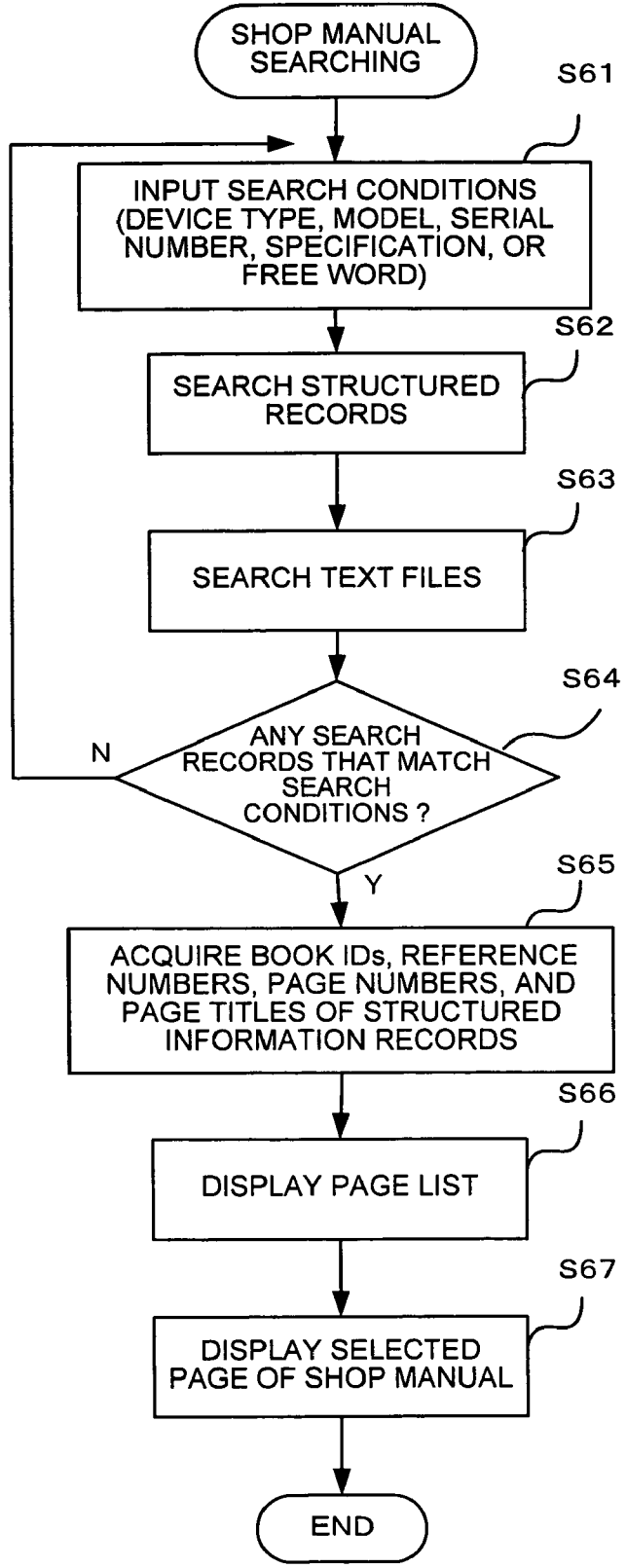
FIG. 11 shows a flow chart of shop manual searching on the basis of input from a search screen.
Figure 12:
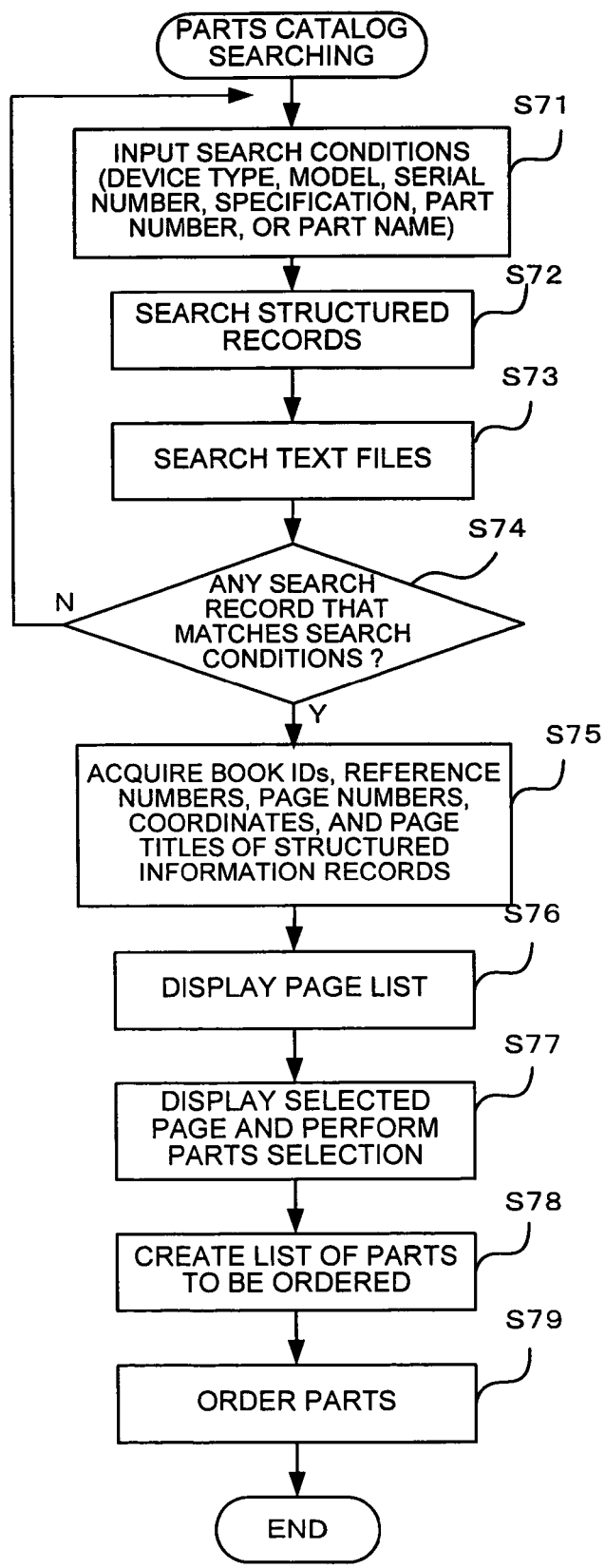
FIG. 12 shows a flow chart of parts catalog searching on the basis of input from a search screen.
Figure 13:
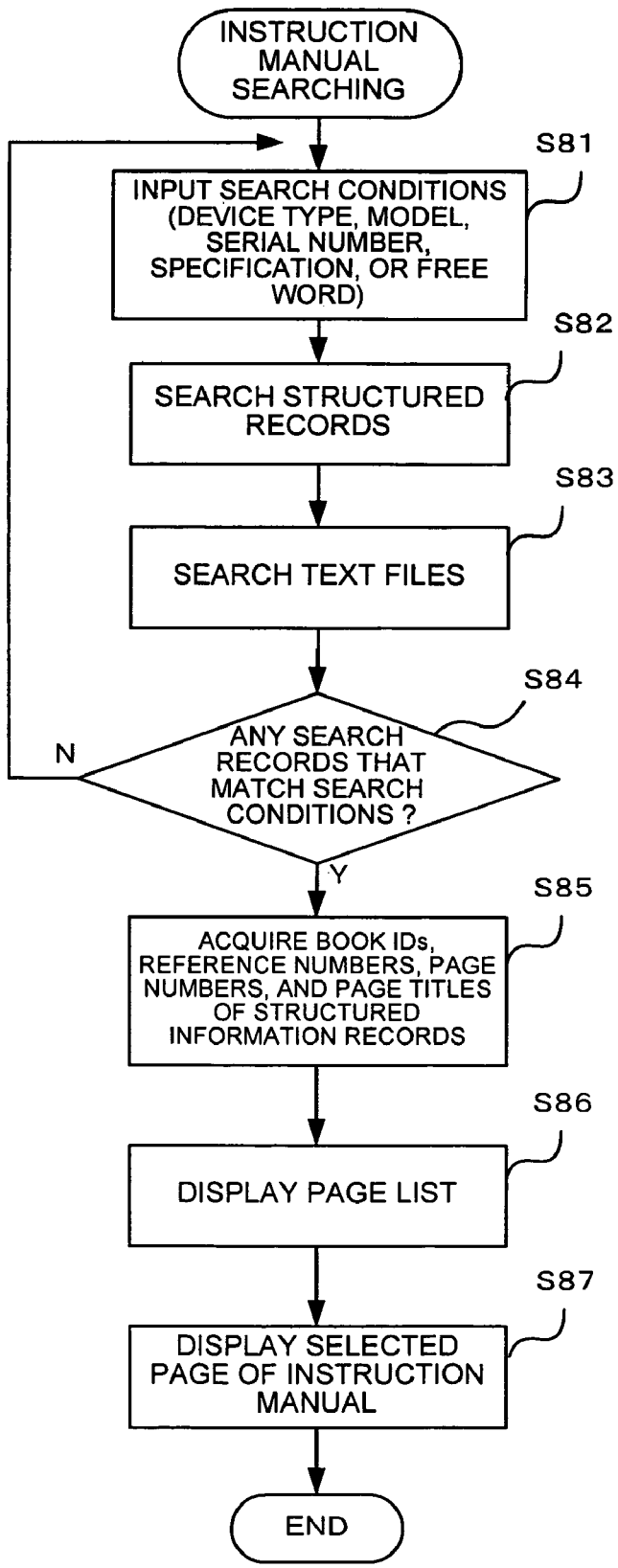
FIG. 13 shows a flow chart of instruction manual searching on the basis of input from a screen.
Figure 14:
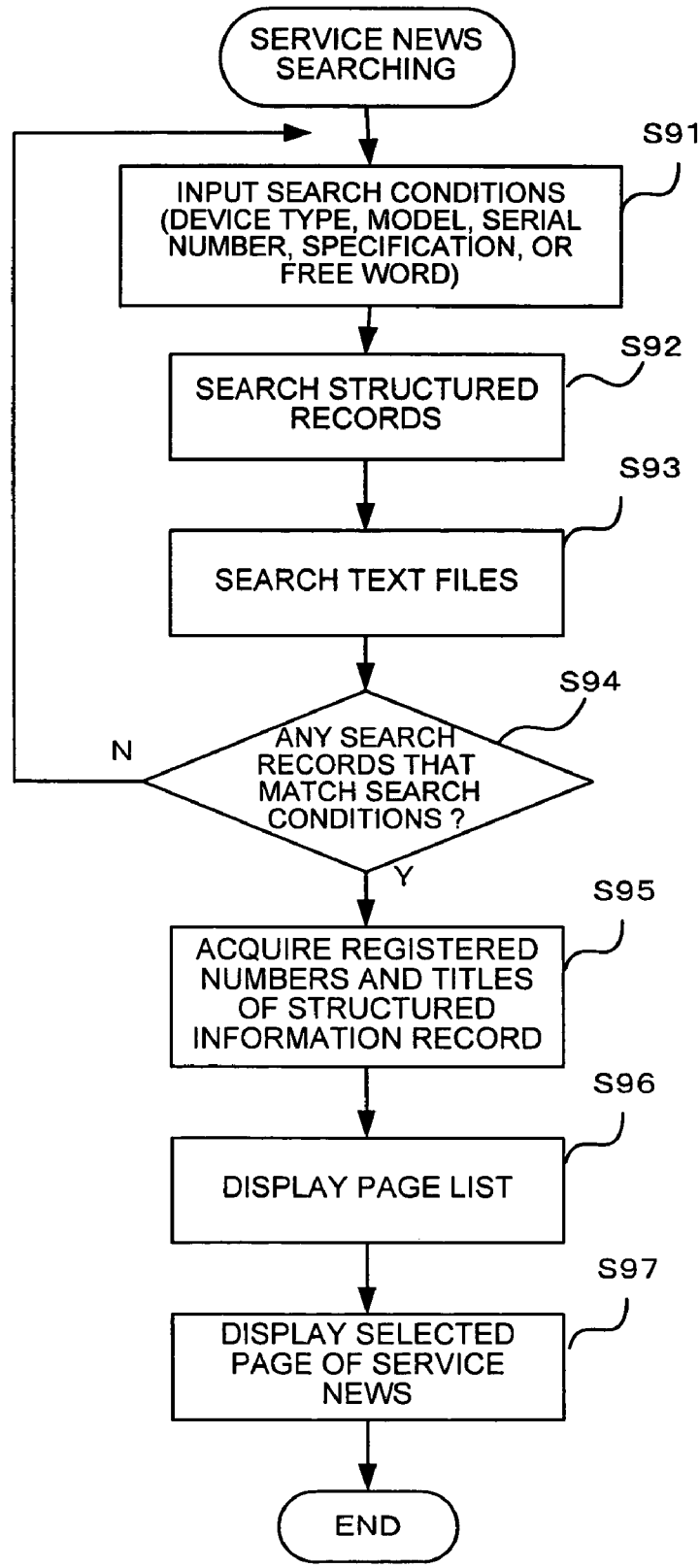
FIG. 14 shows a flow chart of service news searching on the basis of input from a search screen.
Figure 15:
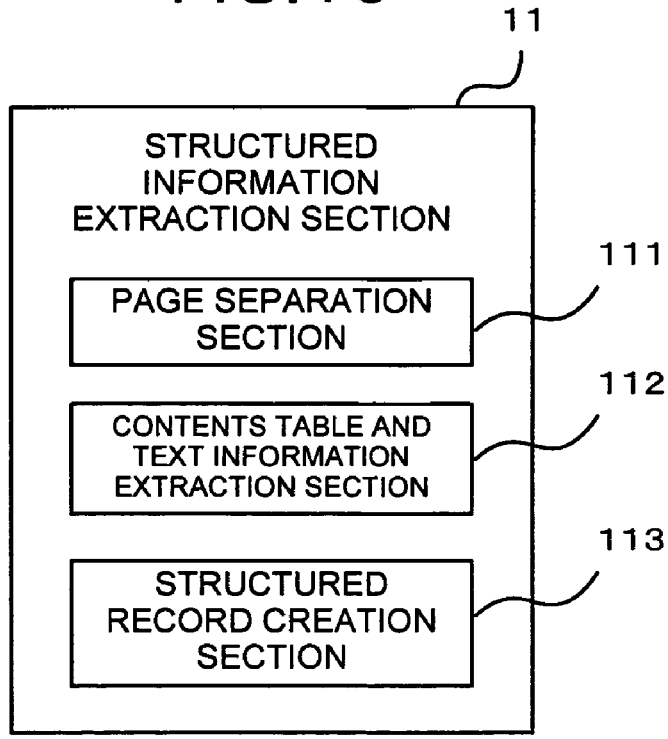
FIG. 15 shows a detailed functional block diagram of a structured information extraction section 11.
Figure 16:
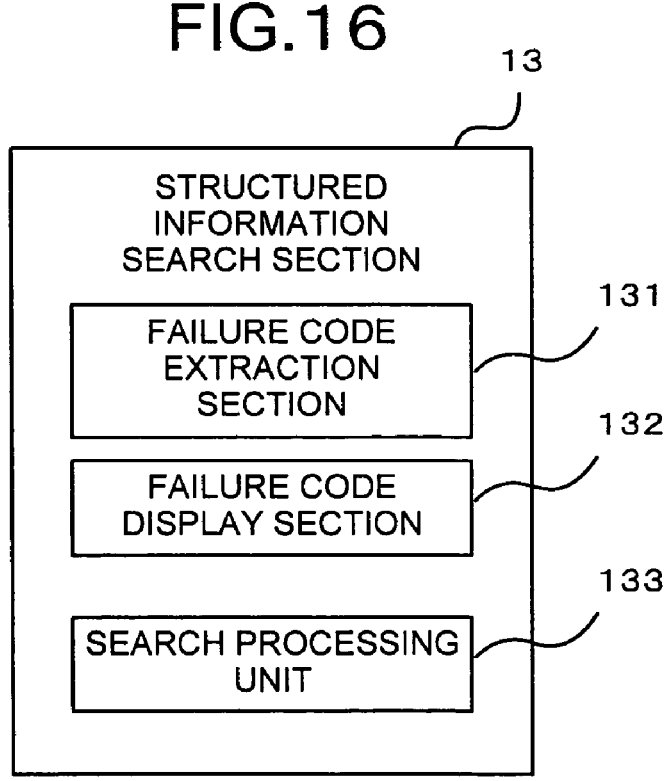
FIG. 16 shows a detailed functional block diagram of a structured information search section 13.

EXPLANATION OF THE REFERENCE NUMERALS 1 integrated management system
2 shop manual management system
3 parts catalog management system
4 instruction manual management system
5 service news management system
6 past example management system
8 moving state management system
11 structured information extraction section
12 data conversion section
13 structured information search section
14 individual database search section

The invention claimed is:

1. A failure countermeasure support system for a mobile vehicle comprising:
    a data conversion means which acquires failure information for a mobile vehicle;
    maintenance databases in which are stored items of maintenance information related to maintenance for remedying failures which it is feared may occur with the mobile vehicle;
    a structured information database in which is stored structured information for referring to said items of maintenance information stored in said maintenance databases;
    a structured information search means which searches said structured information database on the basis of said failure information for said mobile vehicle which has been acquired, and extracts one or more structured information records related to said failure information;
    a display control means which outputs a list of said one or more structured information records extracted by said structured information search means; and
    a structured information extraction section which extracts said structured information from said maintenance information stored in said maintenance databases, and stores a plurality of said structured information records in said structured information database, wherein:
    in said list outputted by said display control means, link information is included to said maintenance information in said maintenance databases, corresponding to said one or more structured information records which are included in said list;
    said maintenance databases have a plurality of individual databases;
    said structured information database has a plurality of structured information tables which respectively correspond to said plurality of individual databases, and a plurality of text files; and
    a plurality of said structured information records are included in each of said plurality of structured information tables, and, in each of said structured information records, there is included identification information for one corresponding text file among said plurality of text files.

2. A failure countermeasure support system for a mobile vehicle, comprising:
    a data conversion means which acquires failure information for a mobile vehicle;
    maintenance databases in which are stored items of maintenance information related to maintenance for remedying failures which it is feared may occur with the mobile vehicle;
    a structured information database in which is stored structured information for referring to said items of maintenance information stored in said maintenance databases;
    a structured information search means which searches said structured information database on the basis of said failure information for said mobile vehicle which has been acquired, and extracts one or more structured information records related to said failure information;

a display control means which outputs a list of said one or more structured information records extracted by said structured information search means;

a past example database which stores past example information, relating to countermeasures which have been implemented in order to remedy a failure of said mobile vehicle which has occurred in the past, and which includes, at least, a device type, a model, a failure code, a device name, and a name of the phenomenon that occurred, related to the failure; and an individual database search means which searches said past example database, and extracts past example information which matches one or more among the device type, the model, the failure code, the device name, and the name of the phenomenon that has occurred, included in the failure information of said mobile vehicle that has been acquired, wherein in said list outputted by said display control means, link information is included to said maintenance information in said maintenance databases, corresponding to said one or more structured information records which are included in said list; and said display control means outputs said past example information related to the result of extraction by said individual database search means, in order of closeness of an operating time period included in said past example information to the operating time period included in said failure information for said mobile vehicle which has been acquired.

3. The failure countermeasure support system for a mobile vehicle according to claim 2, wherein:

said individual database search means:

extracts, as one or more first candidate instances, items of said past example information for which the device type and model, or the device type, match the failure information for said mobile vehicle which has been acquired;

makes decisions, for said one or more first candidate instances, as to whether or not a failure code matches the failure information of said mobile vehicle which has been acquired, and, if any one or more of them match, takes those of said one or more first candidate instances which match as one or more second candidate instances, while, if none match, taking said one or more first candidate instances just as they are as one or more second candidate instances;

makes decisions, for said one or more second candidate instances, as to whether or not a device name matches the failure information of said mobile vehicle which has been acquired, and, if any one or more of them match, takes those of said one or more second candidate instances which match as one or more third candidate instances, while, if none match, taking said one or more second candidate instances just as they are as one or more third candidate instances;

makes decisions, for said one or more third candidate instances, as to whether or not a name of the phenomenon that occurred matches the failure information of said mobile vehicle which has been acquired, and, if any one or more of them match, takes those of said one or more third candidate instances which match as one or more final candidate instances, while, if none match, taking said one or more third candidate instances just as they are as one or more final candidate instances; and outputs said one or more final candidate instances.

4. A failure countermeasure support system for a mobile vehicle, comprising:

a data conversion means which acquires failure information for a mobile vehicle;

maintenance databases in which are stored items of maintenance information related to maintenance for remedying failures which it is feared may occur with the mobile vehicle;

a structured information database in which is stored structured information for referring to said items of maintenance information stored in said maintenance databases;

a structured information search means which searches said structured information database on the basis of said failure information for said mobile vehicle which has been acquired, and extracts one or more structured information records related to said failure information; and a display control means which outputs a list of said one or more structured information records extracted by said structured information search means, wherein in said list outputted by said display control means, link information is included to said maintenance information in said maintenance databases, corresponding to said one or more structured information records which are included in said list;

said failure information for said mobile vehicle is acquired by said data conversion means from a moving state management system of said mobile vehicle, said failure information including information specifying a water temperature or an oil temperature of said mobile vehicle; and when said water temperature or said oil temperature which is included in said failure information is an anomalous water temperature or an anomalous oil temperature, said individual database search means searches for past example information related to said water temperature or to said oil temperature from said past example database.

* * * * *